US004001650B2

United States Statutory Invention Registration [19]

[11] Reg. Number: H1650

Olson

[45] Published: Jun. 3, 1997

[54] IMPERVIOUS CABLE CONNECTED ELECTRICAL COMPONENT ASSEMBLY

[75] Inventor: Jack R. Olson, San Diego, Calif.

[73] Assignee: The United States of America as represented by the Secretary of the Navy, Washington, D.C.

[21] Appl. No.: 27,483

[22] Filed: Feb. 26, 1993

[51] Int. Cl.[6] ..... H01R 43/00

[52] U.S. Cl. ..... 29/868; 29/859; 174/DIG. 8; 156/55; 156/56

[58] Field of Search ..... 174/DIG. 8; 156/55, 156/56; 29/859, 868

[56] References Cited

U.S. PATENT DOCUMENTS

| | | | |
|---|---|---|---|
| 3,582,868 | 6/1971 | Trimble et al. | 174/DIG. 8 X |
| 3,889,047 | 6/1975 | Carver | 174/76 X |
| 3,932,834 | 1/1976 | Sutherland | 367/188 |
| 3,993,859 | 11/1976 | McNeel | 367/188 |
| 4,117,449 | 9/1978 | McNeel | 367/188 |
| 4,291,454 | 9/1981 | Sawaryn | 29/426.6 |
| 4,392,014 | 7/1983 | Trumble et al. | 174/76 X |
| 4,438,292 | 3/1984 | Woodall | 367/188 |
| 4,450,318 | 5/1984 | Scardina | 156/56 X |
| 4,628,851 | 12/1986 | Appling | 114/253 |
| 4,647,716 | 3/1987 | Akiyama et al. | 174/DIG. 8 X |
| 4,770,267 | 9/1988 | Hauser | 181/0.5 |
| 4,863,536 | 9/1989 | Heidenhain et al. | 156/55 X |
| 4,875,957 | 10/1989 | Etheridge | 174/DIG. 8 X |
| 5,014,813 | 5/1991 | Fussell | 181/122 |
| 5,107,584 | 4/1992 | Takeda | 174/DIG. 8 X |

FOREIGN PATENT DOCUMENTS

| | | | |
|---|---|---|---|
| 960097 | 6/1964 | United Kingdom | 264/272 |

*Primary Examiner*—J. Woodrow Eldred
*Attorney, Agent, or Firm*—Harvey Fendelman; Thomas Glenn Keough

[57] ABSTRACT

An impervious cable connected electrical component assembly is provided which includes an electrical component which has a conductive wire extending therefrom. An impervious container is provided which has an open top and a closed bottom. The electrical component is located within the container with its conductive wire extending out of and beyond the container's top. A cable is provided which has a conductive wire within an impervious sheath. A lengthwise portion of this wire is exposed. The conductive wire extending from the top of the container and the exposed conductive wire portion of the cable are electrically joined at a junction outside the container. An impervious sleeve is bonded to the cable sheath so as to hermetically seal the wire junction along the cable. The open top of the container and the sleeve are bonded to hermetically seal the electrical component. With this arrangement the assembly can be easily constructed with minimal effect on the electrical component and, after construction, the assembly can be used with maximum protection of the electrical component.

10 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMPERVIOUS CABLE CONNECTED ELECTRICAL COMPONENT ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to an impervious cable connected electrical component assembly and the process of making such assembly.

Ocean data is frequently gathered by submerged sensors distributed along a cable. It is important that watertight integrity of each sensor be maintained so that signals from the sensor to the cable or vice versa are not shorted to the ocean water. A commonly used sensor is the hydrophone. Other sensors used are pressure transducers, accelerometers and/or thermistors. Recently the sensors have been combined with batteries, amplifiers and/or signal conditioning devices. Many of these sensors and devices are temperature and pressure sensitive. If the temperature or pressure gets too high during assembly these elements can be ruined or undergo calibration shifts.

By way of example, in an existing assembly, a cable that is hundreds of meters long has a multitude of distributed hydrophones attached to it. Each hydrophone is mounted as an appendage to the cable and is appropriately termed a "take out". Because these hydrophones are temperature and pressure sensitive great care must be taken in the process of attaching the hydrophones to the cable. Several construction methods are employed. After connecting the hydrophone to the cable, the connection and the hydrophone are encapsulated with a potting material, such as epoxy or polyurethane. These encapsulation materials are cured at room temperature and pressure. There are two serious problems with this process, namely: (1) long construction time and (2) insufficient watertight integrity of the hydrophone. The curing time of the encapsulation material can be as long as 24 hours for each hydrophone. It is not unusual to create an assembly in which dozens or more of hydrophones are attached to hundreds of meters or more of cable. The amount of labor and time to produce such an assembly can be readily appreciated. This can be aggravated when ventilation of the curing material is required for safety purposes. The other problem involving watertight integrity occurs because of a lack of sufficient bonding of the encapsulation material to the cable sheath. In the past the bonded materials were different, the cable sheath being Surlyn and the component encapsulation material being polyurethane. In the hydrophone application described above, once the bond breaks the hydrophone is rendered useless.

SUMMARY OF THE INVENTION

The present invention overcomes the undue construction time and insufficient bonding problems by providing a novel connection assembly and process of making the assembly. In the preferred embodiment all of the bonded materials are the same e.g. "Surlyn". First, a lengthwise conductive portion of the cable wire may be exposed. One or more electrical components, which may include such items as batteries, electrical components such as hydrophones, are placed within an envelope or container, such as a pocket shaped container, which is preferably "Surlyn". A conductive wire portion from the electrical component extends out of the container and is connected to the conductive wire portion of the cable. A sleeve extends over the wire connection and sheath portions extending therefrom. The sleeve is bonded to the sheath portions to hermetically seal the wire connection along the cable. This bonding can be accomplished swiftly with a melting temperature and a high pressure without damage to the electrical component since the electrical component is sufficiently distant from the sheath—to—sleeve bonding region. Next, the top of the container or pocket is bonded to the sleeve so that the electrical component is hermetically sealed. This bonding is accomplished with a localized melting process so that operational integrity of the electrical component is maintained. Due to the speed of the process of bonding the container to the sleeve and to the distance of the electrical component from the sheath—to—sleeve bonding region, the integrity of the electrical component is maintained. The construction of the assembly is greatly facilitated by this two step bonding process. The process of this invention results in a structure in which the electrical component is encased in an envelope that is impervious to contaminants from the exterior of the envelope as by water penetration, air or any other contaminant.

In another embodiment of the present invention, the process described can be used to affix electric components to structures other than cables. For instance, the process can be used to affix an electronic component to a credit card to create an "electronic credit card". In such embodiment, the electrical component is first encapsulated in an envelope. The component may then be potted, if desired, as is well known. The edges of the envelope are then sealed to the credit card by thermoplastic bonding as described herein. The bonding of the envelope is performed sufficiently rapidly and the component is sufficiently distant from the credit card—to—envelope bonding region so as preserve and maintain the integrity of the electric component.

Statement of Objects of the Invention

An object of the present invention is to overcome the aforementioned problems associated with prior art cable connected distributed sensor assemblies and the process of making these assemblies.

Another object is to provide a cable connected electrical component assembly which is easy to construct and has watertight integrity which is equal to an integral unit.

A further object is to provide a cable connected electrical component assembly which can be constructed in a two step bonding process which does not affect the functionality of the electrical component.

Still another object is to provide an impervious cable connected electrical component assembly where the electrical component is located remotely from the areas requiring bonding.

Still a further object is to provide a process which can be employed to construct a cable connected electrical component assembly quicker, cheaper and yet results in a better product.

Another object of the present invention is to disclose a process of bonding an electrical component to another structure while maintaining integrity of the component.

Other objects will become apparent when considered in light of the ensuing description of the invention.

DESCRIPTION OF PREFERRED EMBODIMENTS

Figure 1:
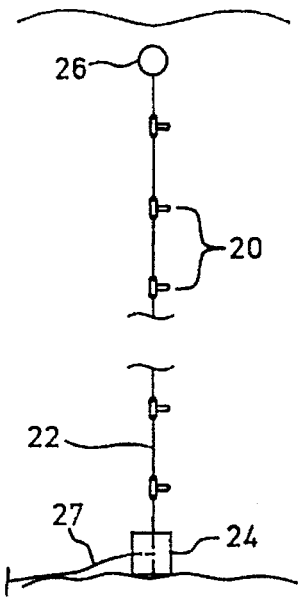
FIG. 1 is a side view of a cable connected multiple hydrophone assembly.

Referring now to the drawings where like reference numerals designate like or similar parts throughout the several views there is shown in FIG. 1*a* vertical array of hydrophone assemblies 20. The vertical array has an electrical cable 22 which is moored to the ocean bottom by an anchor 24 and is forced toward the upright position by a buoy 26. The hydrophone assemblies are connected to the electrical cable 22 at spaced intervals therealong. Hydrophone signals can be transmitted via bottom cables 27 to a signal processing receiving station (not shown) to determine the location of objects in the ocean water. A multiple of such arrays may employ literally hundreds of hydrophone assemblies which undergo severe environmental conditions in the ocean water. It is important that the attachment of the hydrophone assembly to the cable 22 be leakproof. It is also important that the attachment not be labor intensive because of the large number of hydrophone assemblies involved in just one array setup. The present invention provides waterproof attachments with a minimum of labor required.

Figure 2:
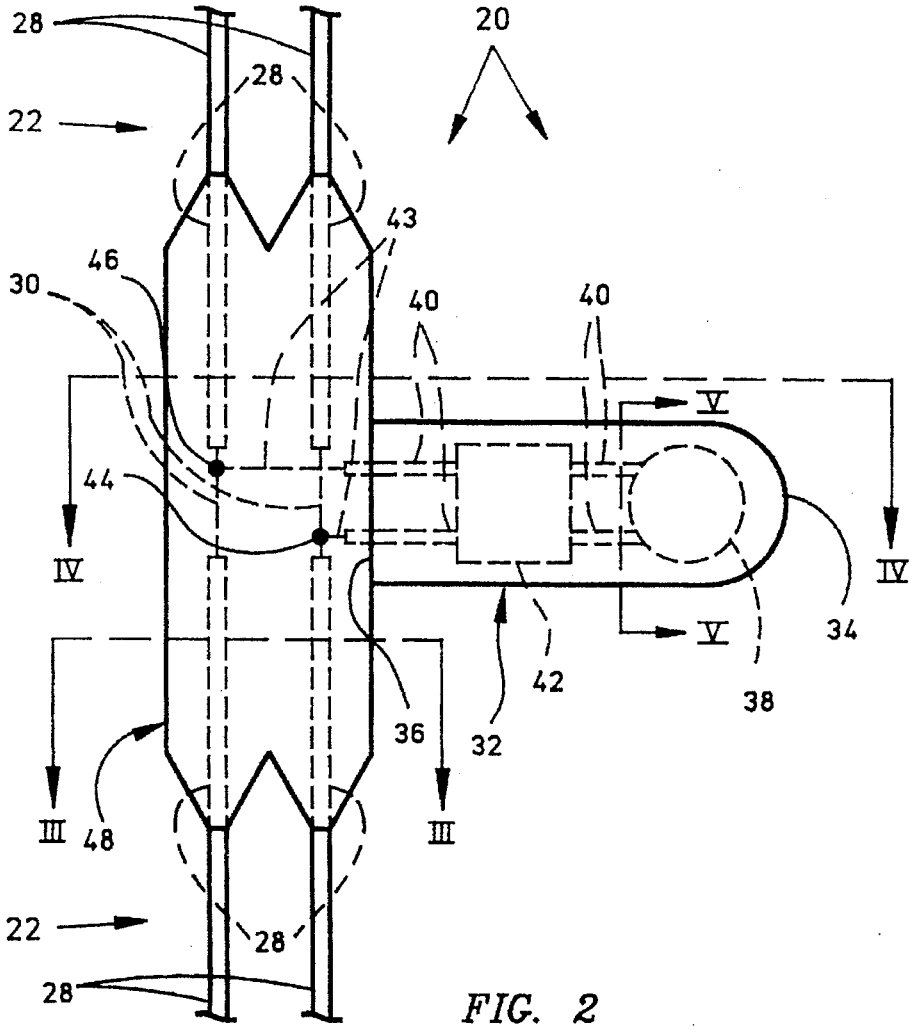
FIG. 2 is an enlarged side view of a single hydrophone connected to a cable intermediate the cable ends.
Figure 3:
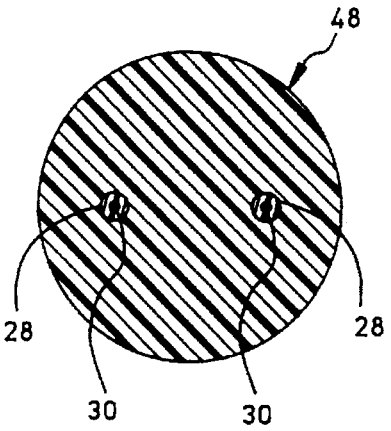
FIG. 3 is a view taken along plane III—III of FIG. 2.
Figure 5:
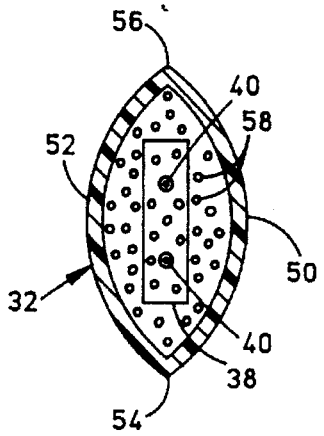
FIG. 5 is a view taken along plane V—V of FIG. 2.
Figure 4:
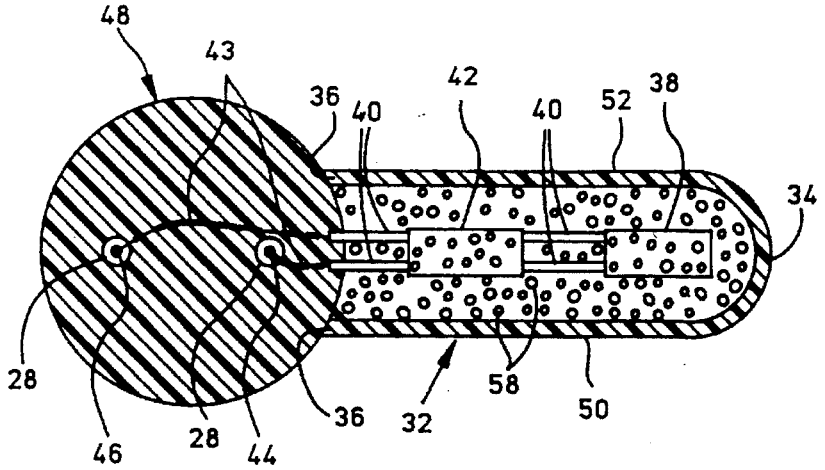
FIG. 4 is a view taken along plane IV—IV of FIG. 2 with portions removed to show various details thereof.

In FIG. 2, the hydrophone assembly 20 is shown connected in line to a pair of sheath covered wires 28 of the cable 22. As shown in FIG. 2, each wire 28 has an intermediate exposed conductive wire portion 30. The sheath is impervious to water, air and other substances that could foul the cable. It is preferably comprised of "Surlyn", which is a trademark for a material made by Dupont. This material is described in more detail hereinafter. The wires 28 of the cable may be held together by any suitable means, such as a nylon cord wrap (not shown). Strength for mooring may be provided by an "Kevlar" cord (not shown). As shown in FIGS. 2, 4 and 5, an impervious container, such as a pocket 32, is provided which has a closed bottom 34 and an open top 36. A hydrophone 38 is disposed in the pocket 32 and may have a pair of sheath covered wires 40 which extend via an amplifier/battery pack 42 out of and beyond the top 36 of the pocket 32. Each of the wires 40 has an exposed conductive end portion 43 which may be soldered to a respective one of the pair of conductive intermediate portions 30 of the cable wires 28 at junctions 44 and 46. As shown in FIGS. 2 and 4, end portions of the sheaths of the wires 40 and intermediate portions of the sheaths of the wires 28 are removed to expose the conductive wire portions 43 and 30 respectively for soldering.

As shown in FIG. 2, an impervious elongate thermoplastic sleeve 48 contains the electrical junctions 44 and 46 as well as sheath portions of the wires 28 extending in opposite directions from the junctions. This sleeve, which is preferably Surlyn, may be made by injection molding which is a high pressure process which will be described in more detail hereinafter. This process will bond the sleeve 48 to the cable sheath portions of the wires 28 so that a hermetic seal is produced for the junctions 44 and 46 along the cable 22. It is important to note that the high pressure process, which can be thousands of pounds per square inch, is remote from the delicate hydrophone 38 and the amplifier/battery pack 42. This is important in order to achieve two important results, namely: (1) good bonding to hermetically seal the junctions 44 and 46 and (2) improved time for manufacturing the product.

Sleeve 48 and container 32 are preferably of the same material and the same impervious quality as described above with respect to the cable 22 sheath.

In order to complete the seal of the hydrophone assembly 20, the top 36 of the pocket 32 is bonded to the sleeve 48 so as to hermetically seal the hydrophone 38 and the amplifier/battery pack 42. It is important that the pocket be shaped so that it is adapted for facilitating the bonding process. As shown in FIGS. 4 and 5, the pocket has two sides 50 and 52 which are hermetically joined together at edges 54 and 56. This then provides a generally oblong cross-section, as shown in FIG. 5. The top 36 of the pocket, which has generally the same shape, is adapted to make substantial mating engagement with the side of the sleeve 48. The bonding is achieved by a melting process of the pocket top 36 and the portion of the sleeve 48 adjacent thereto. This can be done by any suitable bonding process but preferably by either a vibration or ultrasound process which will be described in more detail hereinafter. It is important to note, however, that this localized bonding will not affect the delicate hydrophone 38 and the amplifier/battery pack 42. This process serves two important purposes, namely: (1) bonding the pocket 32 to the sleeve 48 to hermetically seal the hydrophone 38 and the amplifier/battery pack 42 and (2) significant improvement in the time required to manufacture the product.

It is preferable that the pocket 32, sleeve 48 and the sheaths of the wires 28 and 40 all be constructed of "Surlyn". This material makes an exceptionally good bond of all of these elements and is impervious to intrusion by contaminants and very resistive to the harsh ocean environment. However, one or all of these elements could be constructed of other thermoplastic materials provided the material is bondable to the other materials. Other suitable materials are polyurethane, polyethylene, polypropylene and polystyrene.

When the pocket is constructed of "Surlyn" there is some flexure to it which is desirable in a deep ocean environment. With this arrangement the pocket can be filled with a protective material 58, such as polyurethane, which itself is somewhat flexible. Alternatively, the pocket can be filled with a potting material, such as hard epoxy. Even entrapped air in the pocket will provide protection for the electrical components therein. No matter what protective material is employed, it is desirable that the pocket 32 be big enough so that the electrical component or components can be spaced in the pocket with the protective material between the component and the inside surfaces of the pocket.

Many different types of electrical components can be placed in the pocket within the spirit of the invention. Exemplary components are acoustic sensors, temperature sensors, pressure sensors, salinity sensors, conductivity sensors, current sensors, tilt sensors, compasses, amplifiers, integrated circuits and/or batteries. Each of these components are sensitive to heat and pressure, and yet, with the present invention, can be made into an effective electrical device by the improved manufacturing techniques.

The manufacturing technique or process for making the hydrophone or other electrical component cable connected assembly 20 is illustrated in FIGS. 6–14. While the steps are described in a particular order it should be understood that some of the steps can come earlier or later than that described. Further, the process is described for a two wire cable and a two wire electrical component. Within the scope of the present invention, however, components and cables with more than two wires. Alternatively, single wire components and cables can be used, such as in systems where the sea water acts as the return.

Figure 6:
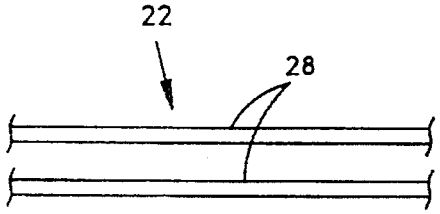
FIG. 6 is a side view of a pair of sheathed cable wires.
Figure 7:
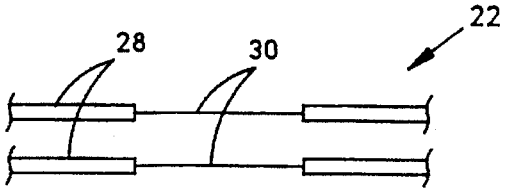
FIG. 7 is a side view of a pair of sheathed cable wires with intermediate exposed conductive wire portions.
Figure 8:
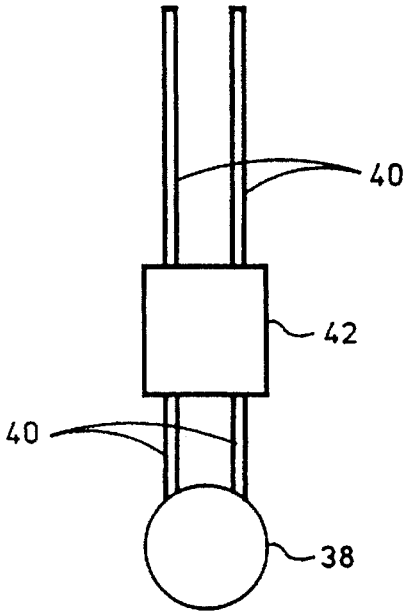
FIG. 8 is a side view of an electrical component which has a pair of sheathed wires.
Figure 9:
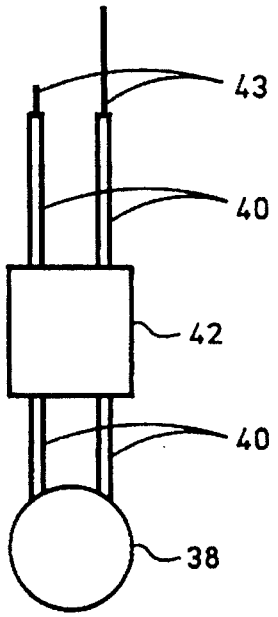
FIG. 9 is a side view of the electrical component with end conductive portions of the wires being exposed.
Figure 10:
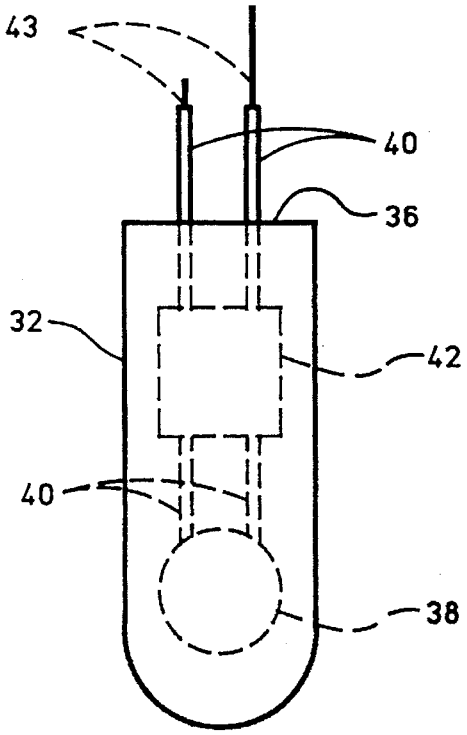
FIG. 10 is a side view of the electrical component placed in a pocket container.
Figure 11:
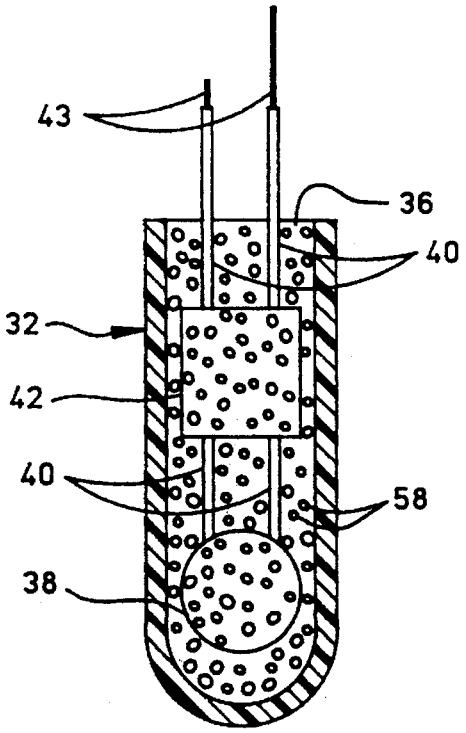
FIG. 11 is the same as FIG. 10 except half of the pocket is broken away to show protective material therein.
Figure 12:
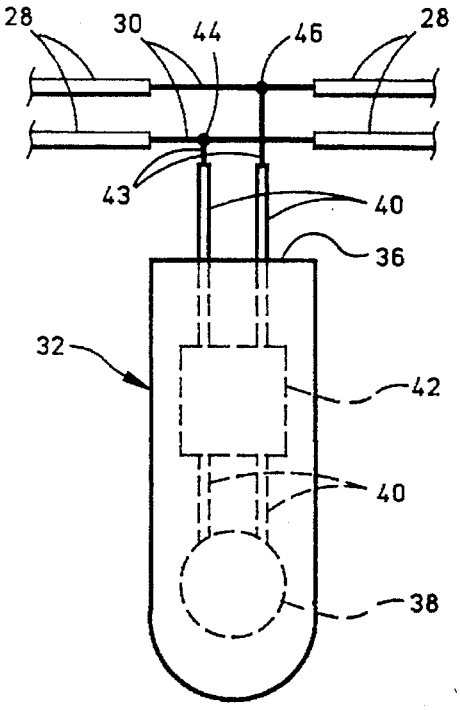
FIG. 12 is a side view of the electrical component exposed conductive wire portions connected to the cable wire exposed conductive portions.

As shown in FIG. 6, the process can start with the two wires 28 of the cable 22. As shown in FIG. 7, an intermediate portion of the sheath of each wire 28 has been removed to expose conductive wire portions 30. In FIG. 8, electrical components, such as the hydrophone 38 and amplifier/battery pack 42, are provided with the pair of wires 40. As shown in FIG. 9, sheath portions at the ends of these wires are removed to expose conductive wire end portions 43. As shown in FIG. 10, a low melt temperature thermoplastic container or pocket 32 is provided. The electrical components 38 and 42 are placed in the pocket 32 with the exposed conductive wire portions 43 extending out of and beyond the top 36 of the pocket. As shown in FIG. 11, the pocket can be filled with the protective material 58, such as polyurethane. As shown in FIG. 12, the exposed conductive wire portions 43 of the wires 40 from the electrical components extend to the exposed conductive wire portions 30 of the cable wires 28 where they are joined as by soldering to provide conductive junctions 44 and 46.

Figure 13:
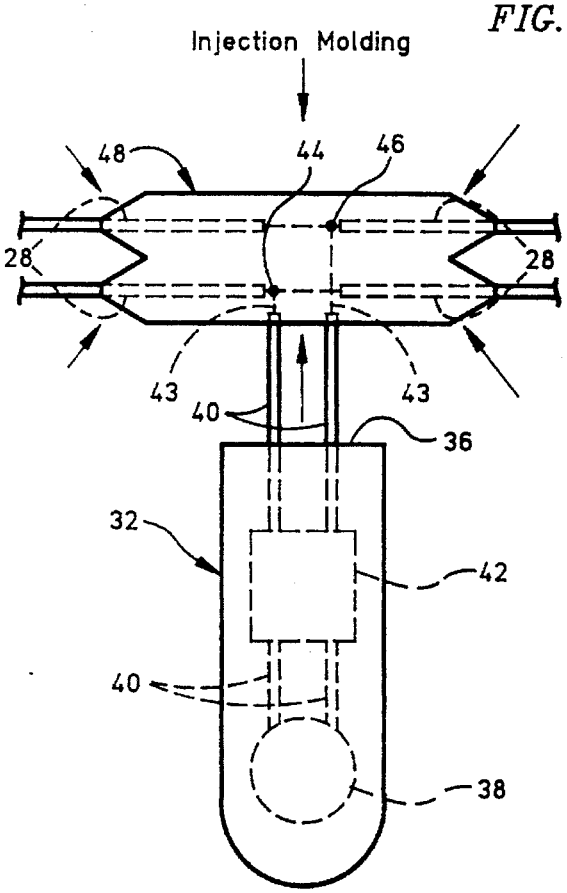
FIG. 13 is the same as FIG. 11 except a sleeve is bonded to the wire sheaths.
Figure 14:
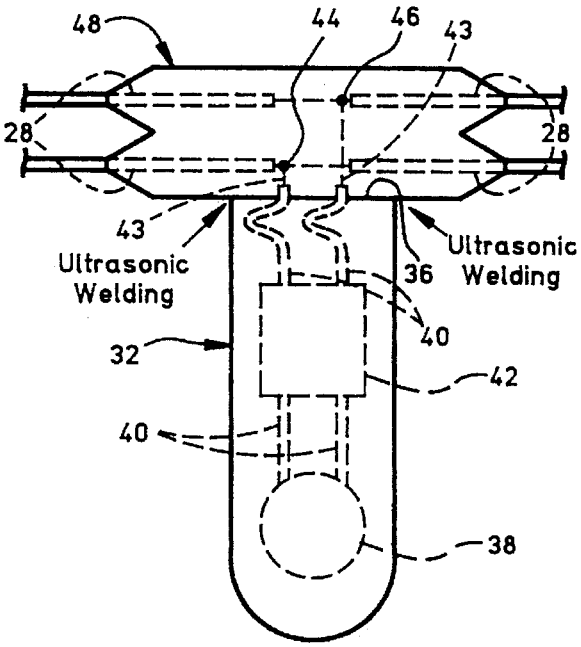
FIG. 14 is the same as FIG. 13 except the pocket container is bonded to the sleeve.

As shown in FIG. 13, the sleeve 48 is molded about the electrical junctions 44 and 46 as well as the sheath portions extending in opposite directions therefrom. This encapsulates the junctions 44 and 46 and bonds the sheath portions to the sleeve to hermetically seal the junctions. Injection molding can be utilized which employs molten thermoplastic under high pressure without damaging the electrical components 38/42 in the pocket 32. As shown in FIG. 13, slack in the wires 40 from the electrical components 38 and 42 can be provided so that the pocket can be even more remotely spaced from the mold during the injection molding process. As shown in FIG. 14, this slack can then be jammed into the pocket when it is time for the top 36 of the pocket to be sealed to the finished sleeve 48.

As shown in FIG. 14, the top 36 of the pocket is brought into engagement with the side of the sleeve 48. Localized thermoplastic melting is then applied to their peripheral engagement to produce a bonding between the two parts. In this manner a hermetic seal is made for the electrical components 38 and 42 in the pocket 32. This bonding can take place by either vibration or ultrasonic welding. An exemplary source of supply for both types of welding devices is the Branson Co. in Danbury, Conn.

Vibration welding is a linear friction welding technique in which one plastic part is clamped and vibrated against another plastic part which is fixed in its position. With a frequency of 120 or 240 Hz sufficient heat is generated to melt the interface and produce a bond when solidification occurs. This process can be utilized for the present invention by fixing the sleeve 48 in its position and clamping the pocket 32 with the Branson vibrating device. The pocket is then vibrated against the sleeve until the interface melts, after which it is allowed to cool and make the desired bond.

The Branson ultrasonic device is either a wide blade tool or a pointed tool that applies a frequency of 20 kHz or 40 kHz to the pocket top and sleeve interface for melting the two parts at the interface. The ultrasonic pointed tool is preferable for melting the interface of the top 36 of the pocket to the side of the sleeve 48. After melting, the interface is allowed to cool to produce the desired bond and hermetic seal of the electrical components 38 and 42. The bonding can be accomplished quickly, and most importantly there is no degradation of the electrical components within the pocket 32.

As stated hereinabove, in the preferred embodiment of the present invention, the material for the sheaths of the wires 28 and 40, the sleeve 48, and the pocket 32 is comprised of "Surlyn" which is a registered trademark of Dupont for an ionomer resin. An ionomer is a thermoplastic polymer that is "ionically crosslined". It entails the reaction of copolymers to form bonds between the acid groups within a chain and between neighboring chains. More specifically, ethylene and methacrylic acid copolymers are partially reacted with metallic salts. "Surlyn" melts at temperatures between 210° and 260° C. It should be understood that other thermoplastic materials could be used such as polyurethane, polyethylene, polypropylene or polystyrene.

Figure 15:
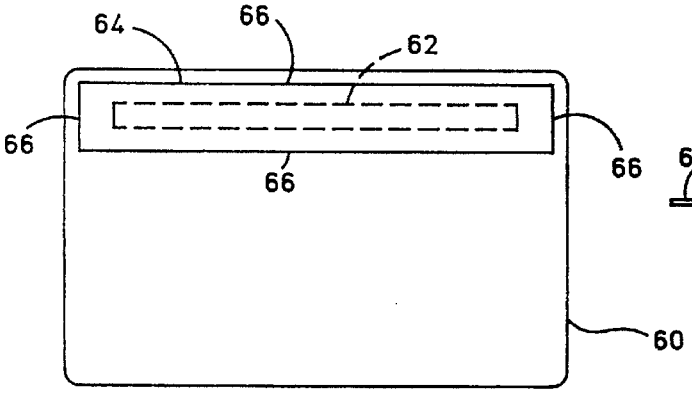
FIG. 15 is a top view of an "electronic credit card" constructed in accordance with the present invention.
Figure 16:
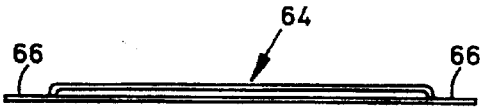
FIG. 16 is a side view of the component cover of FIG. 15.

Referring to FIG. 15 another embodiment of the present invention is illustrated. Credit card 60 is an "electronic credit card." Attached to credit card 60 is electrical component 62 such as an integrated circuit. Component 62 may, for example, also include a battery or any device or devices desired to be attached to card 60. Component 62 is attached to card 60 by means of cover 64. Cover 64 shown in side view in FIG. 16 is preferably hermetically sealed to card 60. Cover 64 is comprised of a thermoplastic material, preferably the same material that is used for credit card 60. If desired, cover 64 may be a closed container and may completely encase component 62. Also if desired, component 62 may be potted (not shown) within cover 64 as would be readily understood. In order to affix the component 62 / cover 64 package to the surface of the credit card, the edges 66 of cover 64 and the surface of the card 60 to which the component is to be affixed are thermoplastically bonded as by ultrasonic or vibration bonding as described above. In this manner the component may be affixed to the card without damaging the component. Although this embodiment of the present invention has been described with respect to affixing an electronic component to a credit card, it is within the scope of the present invention that any kind of component be attached to another structure by utilizing a component cover and thermoplastically bonding the cover to other structure.

Obviously, many modifications and variations of the present invention are possible in light of the above teachings. It is therefore to be understood that within the scope of the appended claims, the invention may be practiced other than as specifically described.

What is claimed is:

1. A method of constructing an impervious assembly wherein the assembly includes an electrical cable and an electrical component, each having at least one conductive wire within a sheath comprising the steps of:

exposing a conductive wire portion of said electrical cable and said electrical component conductive wire;

providing a thermoplastic container which has a top and a bottom;

placing the electrical component within the container with the exposed conductive wire portion extending beyond the top of the container so as to be in proximity to the exposed conductive wire portion of the cable;

joining the exposed conductive wire portions of the electrical component and the cable to form an electrically conductive junction;

encasing the electrical wire junction and portions of the wire sheath extending from the junction in a thermoplastic sleeve so as to hermetically seal the wire junction; and applying localized heat sufficient to bond the top of the container to the sleeve to hermetically seal the electrical component.

2. The method as claimed in claim 1 wherein:

the material of the cable sheath, the sleeve and the container comprise "Surlyn".

3. The method as claimed in claim 2 wherein:

the container comprises a pocket; and the step of bonding the top of the container to the sleeve comprises bonding the top of the pocket to the sleeve.

4. The method of claim 1 wherein the step of applying localized heat comprises the step of ultrasonic welding the container to the sleeve.

5. The method of claim 1 wherein the step of applying localized heat comprises the step of vibration welding the container to the sleeve.

6. The method of claim 1 wherein the step of encasing the electric wire junction and portions of the wire sheath extending from the junction in a thermoplastic sleeve comprises the step of injection molding the sleeve.

7. The method of claim 1 further comprising the step of placing a material in the container to protect the electrical component.

8. The method of claim 7 wherein said material comprises polyurethane.

9. The method of claim 7 wherein said material comprises potting compound.

10. The method of claim 7 wherein said material comprises epoxy.

* * * * *